(12) United States Patent
Chinzei et al.

(10) Patent No.: US 11,725,556 B2
(45) Date of Patent: Aug. 15, 2023

(54) EXHAUST GAS PURIFICATION CATALYST

(71) Applicants: Isao Chinzei, Toyota (JP); Takumi Tojo, Tajimi (JP); Takahiro Nishio, Toyota (JP); Yosuke Toda, Kakegawa (JP); Hirotaka Ori, Kakegawa (JP); Minoru Ito, Kakegawa (JP); Sho Hoshino, Kakegawa (JP)

(72) Inventors: Isao Chinzei, Toyota (JP); Takumi Tojo, Tajimi (JP); Takahiro Nishio, Toyota (JP); Yosuke Toda, Kakegawa (JP); Hirotaka Ori, Kakegawa (JP); Minoru Ito, Kakegawa (JP); Sho Hoshino, Kakegawa (JP)

(73) Assignees: TOYOTA JIDOSHA KABUSHIKI KAISHA, Toyota (JP); CATALER CORPORATION, Kakegawa (JP)

( * ) Notice: Subject to any disclaimer, the term of this patent is extended or adjusted under 35 U.S.C. 154(b) by 0 days.

(21) Appl. No.: 17/682,646

(22) Filed: Feb. 28, 2022

(65) Prior Publication Data

US 2022/0298942 A1    Sep. 22, 2022

(51) Int. Cl.
*B01J 21/04*     (2006.01)
*B01J 21/06*     (2006.01)
(Continued)

(52) U.S. Cl.
CPC .............. *F01N 3/105* (2013.01); *B01J 21/04* (2013.01); *B01J 21/066* (2013.01); *B01J 23/10* (2013.01);
(Continued)

(58) Field of Classification Search
CPC . B01J 21/04; B01J 21/066; B01J 23/02; B01J 23/10; B01J 23/42; B01J 23/44;
(Continued)

(56) References Cited

U.S. PATENT DOCUMENTS 6,524,992 B2 *   2/2003  Mussmann .......... B01D 53/945
                                                   502/302
8,039,418 B2 *  10/2011  Kitamura ............. B01J 37/0244
                                                   502/328
(Continued)

FOREIGN PATENT DOCUMENTS

JP    H05-293376 A    11/1993
JP    2007-132355 A    5/2007
(Continued)

*Primary Examiner* — Cam N. Nguyen
(74) *Attorney, Agent, or Firm* — Oliff PLC

(57) ABSTRACT

Provided is an exhaust gas purification catalyst having an improved catalyst performance while securing an OSC in an air-fuel ratio (A/F) rich atmosphere where HC poisoning is likely to occur. The present disclosure relates to an exhaust gas purification catalyst including a substrate and a catalyst coating layer coated on the substrate. The catalyst coating layer has an upstream coat layer formed from an end portion in an upstream side with respect to an exhaust gas flow direction in the exhaust gas purification catalyst and a downstream coat layer formed from an end portion in a downstream side with respect to the exhaust gas flow direction in the exhaust gas purification catalyst. The downstream coat layer includes Rh as a catalytic metal, alumina-ceria-zirconia complex oxide, and alkaline earth metal.

16 Claims, 3 Drawing Sheets

(51) Int. Cl.

| | | |
|---|---|---|
| *B01J 23/02* | (2006.01) | |
| *B01J 23/10* | (2006.01) | |
| *B01J 23/42* | (2006.01) | |
| *B01J 23/44* | (2006.01) | |
| *B01J 23/46* | (2006.01) | |
| *B01J 23/56* | (2006.01) | |
| *B01J 23/58* | (2006.01) | |
| *B01J 23/63* | (2006.01) | |
| *B01J 35/04* | (2006.01) | |
| *F01N 3/10* | (2006.01) | |

(52) U.S. Cl.
CPC ............... *B01J 23/42* (2013.01); *B01J 23/44* (2013.01); *B01J 23/464* (2013.01); *F01N 3/101* (2013.01); *F01N 2330/02* (2013.01); *F01N 2370/02* (2013.01); *F01N 2430/06* (2013.01)

(58) Field of Classification Search
CPC . B01J 23/464; B01J 23/56; B01J 23/58; B01J 23/63; B01J 35/04; F01N 3/101; F01N 3/105
USPC ....... 502/304, 328, 332–334, 339, 349, 355, 502/415, 439
See application file for complete search history.

(56) References Cited

U.S. PATENT DOCUMENTS

| | | | | |
|---|---|---|---|---|
| 8,071,052 | B2* | 12/2011 | Baeuerle | F16K 99/0001 422/503 |
| 8,828,343 | B2* | 9/2014 | Liu | B01J 37/0228 502/262 |
| 8,833,064 | B2* | 9/2014 | Galligan | B01J 37/0244 502/262 |
| 9,266,092 | B2* | 2/2016 | Arnold | B01J 23/63 |
| 9,540,980 | B2* | 1/2017 | Hilgendorff | B01J 35/1019 |
| 9,604,175 | B2* | 3/2017 | Hatfield | B01J 23/83 |
| 9,707,545 | B2* | 7/2017 | Felix | B01J 23/8946 |
| 10,143,968 | B2* | 12/2018 | Suzuki | B01J 35/0006 |
| 10,189,011 | B2* | 1/2019 | Kanazawa | B01J 35/002 |
| 10,618,034 | B2* | 4/2020 | Kasuya | B01J 35/0006 |
| 10,753,248 | B2* | 8/2020 | Hirota | B01J 35/0006 |
| 10,773,209 | B2* | 9/2020 | Liu | B01J 37/0225 |
| 10,987,658 | B2* | 4/2021 | Camm | B01J 37/0215 |
| 11,110,447 | B2* | 9/2021 | Dong | B01D 53/9468 |
| 11,141,697 | B2* | 10/2021 | Chen | B01J 23/002 |
| 11,207,642 | B2* | 12/2021 | Goodwin | B01D 53/945 |
| 11,364,485 | B2* | 6/2022 | Qiao | B01J 35/0006 |
| 11,439,987 | B2* | 9/2022 | Ji | B01J 23/44 |
| 11,577,234 | B2* | 2/2023 | Dong | B01D 53/9472 |
| 2012/0189503 | A1 | 7/2012 | Akamine et al. | |
| 2013/0150236 | A1 | 6/2013 | Aoki | |
| 2013/0213000 | A1 | 8/2013 | Segawa | |
| 2014/0357480 | A1 | 12/2014 | Aoki | |
| 2016/0256854 | A1 | 9/2016 | Aoki | |
| 2018/0318800 | A1* | 11/2018 | Chandler | B01J 37/0248 |
| 2019/0111389 | A1* | 4/2019 | Camm | B01J 23/63 |
| 2019/0240643 | A1* | 8/2019 | Karpov | B01J 37/0211 |
| 2020/0030775 | A1* | 1/2020 | Kitamoto | F01N 3/2803 |
| 2020/0102868 | A1* | 4/2020 | Fujimori | B01J 23/42 |
| 2020/0271031 | A1* | 8/2020 | Chen | F01N 3/101 |
| 2021/0205788 | A1* | 7/2021 | Kadono | F01N 13/16 |
| 2022/0212169 | A1* | 7/2022 | Vjunov | B01J 23/42 |

FOREIGN PATENT DOCUMENTS

| | | |
|---|---|---|
| JP | 2011-101839 A | 5/2011 |
| JP | 2012-096201 A | 5/2012 |
| JP | 2013-136032 A | 7/2013 |
| JP | 5594161 B2 | 9/2014 |
| JP | 2015-073943 A | 4/2015 |
| JP | 5720949 B2 | 5/2015 |
| JP | 2020-131111 A | 8/2020 |

\* cited by examiner

EXHAUST GAS PURIFICATION CATALYST

CROSS REFERENCE TO RELATED APPLICATIONS

The present application claims priority from Japanese patent application JP 2021-035464 filed on Mar. 5, 2021, the entire content of which is hereby incorporated by reference into this application.

BACKGROUND

Technical Field

The present disclosure relates to an exhaust gas purification catalyst.

Description of Related Art

An exhaust gas discharged from an internal combustion engine for an automobile and the like, for example, an internal combustion engine, such as a gasoline engine or a diesel engine, contains harmful components, such as carbon monoxide (CO), hydrocarbon (HC), and nitrogen oxides (NOx).

Therefore, the internal combustion engine generally includes an exhaust gas purification device to decompose and remove these harmful components, and the harmful components are made almost detoxified by an exhaust gas purification catalyst disposed in the exhaust gas purification device.

For example, JP H05-293376 A discloses an exhaust gas purification catalyst that includes at least one monolith carrier having an upstream portion and a downstream portion, at least one layer of upstream portion catalyst layer having a hydrocarbon purification activity coats the upstream portion, and at least one layer of downstream portion catalyst layer having a three-way catalytic activity coats the downstream portion. An outermost layer of the upstream portion catalyst layer contains at least either of Pt and Pd as an active catalyst component and the downstream portion catalyst layer contains at least Rh as an active catalyst component.

JP 2007-132355 A discloses an exhaust gas purifying system including a hydrogen enriching device that increases a component ratio of hydrogen with respect to reducing gas components in exhaust gas and is disposed in a combustion gas or an exhaust gas passageway, a NOx treating catalyst disposed downstream of the hydrogen enriching device in the exhaust gas passageway, and a HC trap catalyst disposed downstream of the NOx treating catalyst in the exhaust gas passageway. The exhaust gas flows from the hydrogen enriching device direct to the NOx treating catalyst continuously. The hydrogen enriching device includes a combustion control device that controls at least one of a fuel injection amount, fuel injection timing, ignition timing, or open/close timing of intake/exhaust valves of an internal combustion engine to produce hydrogen.

JP 2013-136032 discloses an exhaust gas purification catalyst including a substrate and a catalyst coating layer formed on a surface of the substrate. The catalyst coating layer is formed into a layered structure having upper and lower layers with the lower layer being closer to the surface of the substrate and the upper layer being relatively farther therefrom. The catalyst coating layer is provided with Rh and Pd as precious metal catalysts. The catalyst coating layer is provided with an OSC material having an oxygen storage capacity as a support. The Rh is disposed in the upper layer of the catalyst coating layer. The Pd is disposed in both the upper layer and the lower layer of the catalyst coating layer. At least a portion of the Pd in the upper layer and in the lower layer is supported on the OSC material. A mass ratio of the Pd disposed in the upper layer to the Pd disposed in the lower layer is 0.4 or less.

SUMMARY

The exhaust gas purification catalysts in JP H05-293376 A, JP 2007-132355 A, and JP 2013-136032 A have a structure in which the catalyst coating layer is applied on the substrate. The catalyst coating layer includes a precious metal as a catalytic metal.

An amount of precious metal used for an exhaust gas purification catalyst is required to be reduced from an aspect of resource risk. In order to reduce the amount of the precious metal, it is necessary to suppress a decrease in catalytic activity of the precious metal caused by the use of the exhaust gas purification catalyst. In order to suppress the decrease in catalytic activity of the precious metal, for example, it is possible to suppress poisoning of the precious metal by HC in an exhaust gas (HC poisoning), which is one of the causes of decreased catalytic activity of the precious metal.

Meanwhile, the catalyst coating layer optionally includes a material (OSC material) having an oxygen storage capacity (OSC) besides the catalytic metal. The OSC material is a material that can absorb and release oxygen. The OSC material allows keeping an oxygen concentration constant to maintain a purification performance of the exhaust gas purification catalyst even when an air-fuel ratio varies.

That is, as an exhaust gas purification catalyst, an exhaust gas purification catalyst that suppresses HC poisoning of precious metal and has an OSC at the same time is desired.

Accordingly, the present disclosure provides an exhaust gas purification catalyst having an improved catalyst performance while securing an OSC in an air-fuel ratio (A/F) rich atmosphere where HC poisoning is likely to occur.

Conversion of NOx in catalytic activity is done particularly by rhodium (Rh) among precious metals. However, the catalytic activity of Rh is easily decreased by an effect of HC poisoning, and, in particular, for example, under an A/F rich atmosphere where a low oxygen concentration state continues, a surface of Rh possibly be covered by HC, and therefore, the catalytic activity of Rh is more likely to be decreased. Accordingly, to suppress the decrease in catalytic activity, suppressing HC poisoning of Rh is effective.

As a countermeasure of HC poisoning of the precious metal, it is known to make barium (Ba) coexist together with the precious metal. However, Ba that suppresses the HC poisoning of the precious metal significantly delays an oxygen release of the OSC material in the exhaust gas purification catalyst.

Therefore, as a result of inventive studies, the inventors have found the following. In an exhaust gas purification catalyst including a substrate and a catalyst coating layer coated on the substrate, the inventors have disposed an upstream coat layer formed from an end portion in an upstream side with respect to an exhaust gas flow direction in the exhaust gas purification catalyst and a downstream coat layer formed from an end portion in a downstream side with respect to the exhaust gas flow direction in the exhaust gas purification catalyst as the catalyst coating layer. Furthermore, the inventors have disposed Rh, which is a precious metal as a catalytic metal, and alumina ($Al_2O_3$)-ceria (CeO$_2$)-zirconia (ZrO$_2$) complex oxide (ACZ) and alkaline earth metal in the downstream coat layer. As the result, it is possible to suppress HC poisoning of Rh as a precious metal by the alkaline earth metal while securing an OSC by ACZ having fast oxygen absorption/release rate and to provide an exhaust gas purification catalyst with an improved catalyst performance, in particular, an improved NOx conversion performance in a rich atmosphere where particularly HC poisoning is likely to occur. Thus, the inventors achieved the present disclosure.

That is, the outline of the present disclosure is as follows.
(1) An exhaust gas purification catalyst comprising:
a substrate; and
a catalyst coating layer coated on the substrate,
wherein the catalyst coating layer includes an upstream coat layer and a downstream coat layer, the upstream coat layer being formed from an end portion in an upstream side with respect to an exhaust gas flow direction in the exhaust gas purification catalyst, the downstream coat layer being formed from an end portion in a downstream side with respect to the exhaust gas flow direction in the exhaust gas purification catalyst,
wherein the downstream coat layer includes Rh as a catalytic metal, alumina (Al$_2$O$_3$)-ceria (CeO$_2$)-zirconia (ZrO$_2$) complex oxide (ACZ), and alkaline earth metal.
(2) The exhaust gas purification catalyst according to (1),
wherein the alkaline earth metal is barium and/or strontium.
(3) The exhaust gas purification catalyst according to (1) or (2),
wherein the alkaline earth metal has a content of 2 mol to 9 mol with respect to 1 mol of a mole number of Rh.
(4) The exhaust gas purification catalyst according to any one of (1) to (3),
wherein the upstream coat layer includes Pd and/or Pt as catalytic metal.
(5) The exhaust gas purification catalyst according to any one of (1) to (4),
wherein the upstream coat layer and the downstream coat layer overlap, and the upstream coat layer is disposed under the downstream coat layer.
(6) The exhaust gas purification catalyst according to any one of (1) to (5),
wherein the upstream coat layer has a width of 20% to 50% of a whole length of the substrate in the exhaust gas purification catalyst from the end portion in the upstream side with respect to the exhaust gas flow direction in the exhaust gas purification catalyst.
(7) The exhaust gas purification catalyst according to any one of (1) to (6),
wherein the downstream coat layer has a width of 60% to 80% of a whole length of the substrate in the exhaust gas purification catalyst from the end portion in the downstream side with respect to the exhaust gas flow direction in the exhaust gas purification catalyst.

The present disclosure provides an exhaust gas purification catalyst having an improved catalyst performance while securing an OSC in an air-fuel ratio (A/F) rich atmosphere where HC poisoning is likely to occur.

DETAILED DESCRIPTION OF THE EMBODIMENTS

Figure 1:
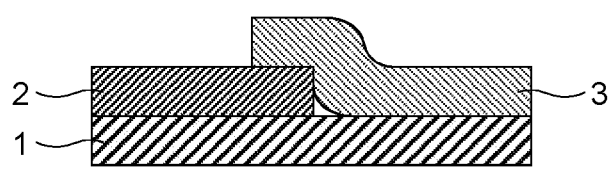
FIG. 1 is a drawing schematically illustrating one embodiment of a catalyst coating layer according to the present disclosure.

The following describes some embodiments of the present disclosure in detail.

In the description, features of the present disclosure will be described with reference to the drawings as necessary. In the drawings, dimensions and shapes of respective components are exaggerated for clarification, and actual dimensions and shapes are not accurately illustrated. Accordingly, the technical scope of the present disclosure is not limited to the dimensions or the shapes of respective components illustrated in the drawings. Note that, an exhaust gas purification catalyst of the present disclosure is not limited to the embodiments below, and can be performed in various configurations where changes, improvements, and the like which a person skilled in the art can make are given without departing from the gist of the present disclosure.

The present disclosure relates to an exhaust gas purification catalyst that includes a substrate and a catalyst coating layer coated on the substrate. The catalyst coating layer has an upstream coat layer formed from an end portion in an upstream side with respect to an exhaust gas flow direction in the exhaust gas purification catalyst and a downstream coat layer formed from an end portion in a downstream side with respect to the exhaust gas flow direction in the exhaust gas purification catalyst. The downstream coat layer includes Rh as a catalytic metal, alumina-ceria-zirconia complex oxide (ACZ), and alkaline earth metal.

(Substrate)

For the substrate, a known substrate having a honeycomb shape is usable, specifically, a monolith substrate having a honeycomb shape (for example, a honeycomb filter and a high-density honeycomb) and the like are employed in some embodiments. The material of such a substrate is not specifically limited, and a substrate made of ceramic, such as cordierite, silicon carbide, silica, alumina, and mullite, and a substrate made of metal, such as stainless-steel including chrome and aluminum are employed in some embodiments. Among these, the cordierite is used in some embodiments from the aspect of cost.

(Catalyst Coating Layer)

The catalyst coating layer at least has an upstream coat layer and a downstream coat layer.

The upstream coat layer is formed from an end portion (an end surface) in an upstream side with respect to an exhaust gas flow direction (a side to which an exhaust gas inflows) in the exhaust gas purification catalyst. The upstream coat layer has a width of usually 20% to 50%, 20% to 40% in some embodiments, of a whole length of the substrate in the exhaust gas purification catalyst.

The width of the upstream coat layer within the range enables to improve a contact frequency of the catalytic metals included in the upstream coat layer with a harmful component in the exhaust gas, such as HC while suppressing an aggregation between the catalytic metals caused by an excessively short width, for example, an aggregation of Pd and Pt caused by a densification of Pd and Pt, and thus enabling an improved exhaust gas purification performance.

The downstream coat layer is formed from an end portion (an end surface) in a downstream side with respect to the exhaust gas flow direction (a side from which the exhaust gas outflows) in the exhaust gas purification catalyst. The downstream coat layer has a width of usually 60% to 80%, 70% to 80% in some embodiments, of the whole length of the substrate in the exhaust gas purification catalyst.

The width of the downstream coat layer within the range enables to improve a contact frequency of Rh included in the downstream coat layer with a harmful component in the exhaust gas, such as NOx while suppressing an aggregation between the catalytic metals caused by the excessively short width, for example, an aggregation of Rh caused by a densification of Rh, and thus enabling the improved exhaust gas purification performance.

The upstream coat layer and the downstream coat layer may form a single layer together on the whole substrate or may have a region they mutually overlap. When the upstream coat layer and the downstream coat layer have the mutually overlapping region, the upstream coat layer is disposed under the downstream coat layer in some embodiments. The upstream coat layer is disposed in a region where the downstream coat layer is not coated and under the downstream coat layer in some embodiments, and the downstream coat layer is disposed in a region where the upstream coat layer is not coated and on the upstream coat layer in some embodiments.

When the upstream coat layer is disposed under the downstream coat layer, the mutually overlapping region of the upstream coat layer and the downstream coat layer has a lap width of usually 0% to 30%, 10% to 20% in some embodiments of the whole length of the substrate in the exhaust gas purification catalyst.

FIG. 1 schematically illustrates one embodiment of the catalyst coating layer according to the present disclosure, in which, in a substrate 1, an upstream coat layer (a front portion) 2 is disposed in a region where a downstream coat layer (a rear portion) 3 is not coated and under the downstream coat layer 3, and the downstream coat layer 3 is disposed in a region where the upstream coat layer 2 is not coated and on the upstream coat layer 2.

The catalyst coating layer may be made only of layers made of the upstream coat layer and the downstream coat layer or may have one or more layers, that is, one layer, two layers, three layers, or four layers or more (lower layer catalyst coating layer(s)) under the layers made of the upstream coat layer and the downstream coat layer, as long as the catalyst coating layer includes the upstream coat layer and the downstream coat layer as uppermost layers. The composition and structure of the lower layer catalyst coating layer(s) are not specifically limited, and may be similar to those of the upstream coat layer and/or the downstream coat layer or may be different from both of them. Furthermore, the lower layer catalyst coating layer(s) is not necessarily uniform over the whole substrate of the exhaust gas purification catalyst, and may have a different composition and structure for each region of the upstream side and the downstream side with respect to the exhaust gas flow direction like the uppermost layers.

Since the catalyst coating layer has the upstream coat layer and the downstream coat layer, HC conversion in the upstream coat layer and NOx conversion in the downstream coat layer can be efficiently performed.

(Downstream Coat Layer)

The downstream coat layer includes Rh as a as catalytic metal, alumina-ceria-zirconia complex oxide (ACZ), and alkaline earth metal.

Alumina-ceria-zirconia complex oxide included in the downstream coat layer has ceria and zirconia dispersed within alumina, and is a complex oxide in which a part of ceria and zirconia forms a ceria-zirconia solid solution, and is observable with a transmission electron microscope (TEM) and the like. Note that the formation of the ceria-zirconia solid solution by ceria and zirconia is confirmable by, for example, X-ray diffraction (XRD).

The inclusion of alumina-ceria-zirconia complex oxide in the downstream coat layer enables to achieve securing a sufficient OSC performance, in particular, securing a sufficient OSC performance under the existence of alkaline earth metal, such as barium and/or strontium for suppressing HC poisoning of Rh because alumina-ceria-zirconia complex oxide has an oxygen absorption/release rate faster than that of ceria-zirconia complex oxide.

The composition of alumina-ceria-zirconia complex oxide included in the downstream coat layer has a Ce/Zr mole ratio of usually 0.6 or less, for example, 0.1 to 0.6, 0.15 to 0.55 in some embodiments, and the content of an alumina ($Al_2O_3$) component is usually 40% by weight to 70% by weight with respect to the total weight of alumina-ceria-zirconia complex oxide. Note that the composition of alumina-ceria-zirconia complex oxide included in the downstream coat layer depends on the composition of alumina-ceria-zirconia complex oxide as a material at the production of the exhaust gas purification catalyst.

The composition of alumina-ceria-zirconia complex oxide within the range enables to sufficiently obtain the effects of suppression of particle growth by alumina (improved heat resistance, securement of specific surface area), securement of oxygen absorption/release performance (OSC) by ceria, and securement of stabilization effect of ceria by zirconia.

Alumina-ceria-zirconia complex oxide included in the downstream coat layer may further include one or more elements selected from rare earth elements other than cerium. The rare earth elements include, for example, scandium (Sc), yttrium (Y), lanthanum (La), praseodymium (Pr), neodymium (Nd), samarium (Sm), gadolinium (Gd), terbium (Tb), dysprosium (Dy), ytterbium (Yb), and lutetium (Lu). The rare earth elements may be Y and La. The content of the rare earth elements is usually 2% by weight to 6% by weight as an oxide with respect to the total weight of alumina-ceria-zirconia complex oxide.

It is possible to improve the heat resistance of alumina-ceria-zirconia complex oxide and improve an OSC by the inclusion of the rare earth element in alumina-ceria-zirconia complex oxide.

The content of alumina-ceria-zirconia complex oxide included in the downstream coat layer is not limited, but is usually 20 g to 120 g, and 80 g to 120 g in some embodiments with respect to 1 L of a capacity of a portion where the downstream coat layer is applied on the substrate. Note that the content of alumina-ceria-zirconia complex oxide included in the downstream coat layer depends on an additive amount of ceria-zirconia complex oxide as a material at the production of the exhaust gas purification catalyst.

The inclusion of alumina-ceria-zirconia complex oxide of the content in the downstream coat layer enables to achieve securing a sufficient OSC performance, in particular, securing a sufficient OSC performance under the existence of alkaline earth metal, such as barium and/or strontium, for suppressing HC poisoning of Rh because alumina-ceria-zirconia complex oxide has an oxygen absorption/release rate faster than that of ceria-zirconia complex oxide.

Primary particles of alumina-ceria-zirconia complex oxide have a particle size (average particle size) that is fine in some embodiments. Although the average particle size thereof is not limited, the average particle size thereof is usually 10 nm or less, for example, 8 nm to 10 nm in average value of a scanning electron microscope (SEM) or a transmission electron microscope (TEM). Ceria-zirconia complex oxide in alumina-ceria-zirconia complex oxide has a crystallite that is fine in some embodiments. Although the crystallite diameter thereof is not limited, the crystallite diameter thereof is usually 10 nm or less, for example, 8 nm to 10 nm. Note that the crystallite diameter of the ceria-zirconia complex oxide can be measured by a half value width of XRD.

The average particle size of alumina-ceria-zirconia complex oxide and the crystallite diameter of ceria-zirconia complex oxide in alumina-ceria-zirconia complex oxide within the ranges enables to sufficiently obtain the effect of the securement of an OSC by ceria.

A BET specific surface area of alumina-ceria-zirconia complex oxide is not limited, but is usually 30 $m^2/g$ or more, 50 $m^2/g$ to 80 $m^2/g$ in some embodiments.

The BET specific surface area of alumina-ceria-zirconia complex oxide within the range enables to sufficiently obtain the effect of the securement of an OSC by ceria.

Alumina-ceria-zirconia complex oxide included in the downstream coat layer can be prepared by, for example, the alkoxide process or the coprecipitation process. By preparing alumina-ceria-zirconia complex oxide in the alkoxide process or the coprecipitation process, it is possible to prepare a complex oxide made of uniform and fine primary particles and to easily prepare the complex oxide including ceria-zirconia solid solution.

In the alkoxide process, all metallic alkoxides, such as alkoxides of aluminum, cerium, zirconium, and optionally the rare earth elements, are mixed and fired (sintered) after hydrolyzing, thereby enabling to prepare alumina-ceria-zirconia complex oxide. Without using all of aluminum, cerium, zirconium, and optionally the rare earth elements as the metallic alkoxides, it is possible to use the rest of the metal as a solution of, for example, nitrate or acetylacetate, as long as at least one of them is used as the metallic alkoxide.

Any one of methoxide, ethoxide, butoxide, and the like may be used as the metallic alkoxide, but the metallic alkoxide with high solubility to alcohol as a solvent may be used. Note that, regarding the alcohol as the solvent, any one can be used.

In the coprecipitation process, for example, water-soluble salts, such as nitrates of all metals, i.e. aluminum, cerium, zirconium, and optionally the rare earth elements are mixed, coprecipitated as a hydroxide with, for example, an ammonia solution, and fired, thereby enabling to prepare alumina-ceria-zirconia complex oxide. Without using all of aluminum, cerium, zirconium, and optionally the rare earth elements as the water-soluble salts, it is possible to use the rest of the metal as a solid of, for example, metal powder or oxide powder as long as at least one of them is used as the water-soluble salt.

Alumina-ceria-zirconia complex oxide thus obtained are preliminarily heat-treated at, usually 500° C. to 900° C. in some embodiments. Preliminarily heat-treating alumina-ceria-zirconia complex oxide enables to further suppress the decrease of an OSC after resistance while suppressing an excessive crystal growth of the particles.

Alumina-ceria-zirconia complex oxide included in the downstream coat layer may be one known in the technical field, for example, ones disclosed in JP H10-202102 A, JP 2001-232199 A, and JP 2012-187518 A.

The downstream coat layer may further include ceria-zirconia complex oxide (CZ).

The inclusion of ceria-zirconia complex oxide in the downstream coat layer enables to secure a sufficient OSC.

In ceria-zirconia complex oxide optionally included in the downstream coat layer, the content ratio of cerium to zirconium in ceria-zirconia complex oxide is usually in the range of 43:57 to 48:52 in mole ratio ([cerium]:[zirconium]). Note that the composition of ceria-zirconia complex oxide depends on a composition of ceria-zirconia complex oxide as a material at the production of the exhaust gas purification catalyst.

The content ratio of cerium to zirconium in ceria-zirconia complex oxide within the range enables to provide a sufficiently high heat resistance and a sufficiently good OSC even after an exposure to a high temperature for a long time.

Ceria-zirconia complex oxide included in the downstream coat layer may further include one or more elements selected from the rare earth elements other than cerium. The rare earth elements include scandium, yttrium, lanthanum, praseodymium, neodymium, samarium, gadolinium, terbium, dysprosium, ytterbium, lutetium, and the like. The rare earth elements may be Y and La. The content of the rare earth elements is usually 1% by weight to 20% by weight, 3% by weight to 7% by weight in some embodiments as an oxide with respect to the total weight of ceria-zirconia complex oxide.

The inclusion of the rare earth elements in ceria-zirconia complex oxide enables to improve the heat resistance of ceria-zirconia complex oxide and improve an OSC.

The content of ceria-zirconia complex oxide optionally included in the downstream coat layer is not limited, but is usually 5 g to 50 g, 5 g to 20 g in some embodiments with respect to 1 L of the capacity of the portion where the downstream coat layer is applied on the substrate. Note that the content of ceria-zirconia complex oxide optionally included in the downstream coat layer depends on an additive amount of ceria-zirconia complex oxide as a material at the production of the exhaust gas purification catalyst.

The inclusion of the content of ceria-zirconia complex oxide in the downstream coat layer enables to secure a sufficient OSC.

Primary particles of ceria-zirconia complex oxide have a particle size (average particle size) that is fine in some embodiments. Although the average particle size thereof is not limited, the average particle size thereof is usually 10 μm or less, for example, 3 μm to 7 μm in average value of the SEM or the TEM. Ceria-zirconia complex oxide has a crystallite that is fine in some embodiments. Although the crystallite diameter thereof is not limited, the crystallite diameter thereof is usually 500 nm or less, for example, 100 nm to 200 nm. Note that the crystallite diameter of ceria-zirconia complex oxide can, for example, be measured by a half value width of XRD.

The average particle size and the crystallite diameter of ceria-zirconia complex oxide within the ranges enables to sufficiently obtain the effect of the securement of an OSC by ceria.

A BET specific surface area of ceria-zirconia complex oxide is not limited, but is usually 2 $m^2/g$ or less, and 0.5 $m^2/g$ to 2 $m^2/g$ in some embodiments.

The BET specific surface area of ceria-zirconia complex oxide within the range enables to sufficiently obtain the effect of the securement of an OSC by ceria.

Ceria-zirconia complex oxide optionally included in the downstream coat layer is conventionally a material used as a cocatalyst (oxygen storage material) in an exhaust gas purification catalyst, and the detail is publicly known to those skilled in the art. In ceria-zirconia complex oxide, ceria and zirconia form a solid solution in some embodiments. Ceria-zirconia complex oxide can be prepared by the alkoxide process or the coprecipitation process. In the coprecipitation process, it is possible to prepare by, for example, adding an ammonia solution into an aqueous solution in which cerium salt (for example, cerium nitrate) and zirconium salt (for example, zirconium oxynitrate) are dissolved to generate a precipitation by coprecipitation, firing the obtained precipitation after drying at usually 400° C. to 500° C. for usually approximately five hours, further pressure-molding the fired precipitation at a pressure of usually 400 $kgf/cm^2$ to 3500 $kgf/cm^2$, and performing a reduction treatment in a temperature condition of usually 1450° C. to 2000° C.

Ceria-zirconia complex oxide optionally included in the downstream coat layer may be one known in the technical field, for example, one disclosed in JP-2011-219329 A.

The alkaline earth metal included in the downstream coat layer is barium and/or strontium in some embodiments, and barium in some embodiments.

The inclusion of the alkaline earth metal in the downstream coat layer enables to improve HC poisoning resistance of Rh by an electron donating property of the alkaline earth metal.

The content of the alkaline earth metal included in the downstream coat layer is usually 2 mol (2 mol/mol) to 9 mol (9 mol/mol), 2 mol (2 mol/mol) to 8 mol (8 mol/mol) in some embodiments, 5 mol (5 mol/mol) to 7 mol (7 mol/mol) in some embodiments with respect to 1 mol of a mole number of Rh. Note that the content of the alkaline earth metal optionally included in the downstream coat layer depends on an additive amount of an alkaline earth metal precursor as a material at the production of the exhaust gas purification catalyst (excluding volatilized components).

The inclusion of the content of the alkaline earth metal in the downstream coat layer enables to suppress a delay in Rh activation caused by the alkaline earth metal being reduced prior to Rh, while improving HC poisoning resistance of Rh by the electron donating property of the alkaline earth metal, thereby enabling to secure a sufficient OSC performance.

The alkaline earth metal included in the downstream coat layer may be in a form of a compound including the alkaline earth metal, for example, oxide, or may be in a form of being supported by alumina-ceria-zirconia complex oxide and/or ceria-zirconia complex oxide, carrier particles optionally included in the exhaust gas purification catalyst of the present disclosure, similarly to Rh described below.

The content of Rh as the catalytic metal included in the downstream coat layer is not limited, but is usually 0.05 g to 1.0 g, 0.2 g to 0.8 g in some embodiments in a metal conversion of Rh with respect to 1 L of the capacity of the portion where the downstream coat layer is applied on the substrate. Note that the content of Rh optionally included in the downstream coat layer depends on an additive amount of a Rh precursor as a material at the production of the exhaust gas purification catalyst (excluding volatilized components).

The inclusion of the content of Rh in the downstream coat layer enables to sufficiently provide a NOx conversion performance without HC poisoning of Rh under the atmosphere where HC is sufficiently converted by the upstream coat layer.

The downstream coat layer may further include catalytic metal generally used in the technical field of the exhaust gas purification catalyst besides Rh, for example, may further include at least one selected from precious metals, specifically, a group formed of Pt, Pd, Au, Ag, Ir, and Ru.

While Rh included in the downstream coat layer functions as an exhaust gas purification catalyst even as it is, in some embodiments, Rh is supported by alumina-ceria-zirconia complex oxide, ceria-zirconia complex oxide, or carrier particles optionally included in the exhaust gas purification catalyst of the present disclosure.

The carrier particles that support Rh are not specifically limited, but may be particles of alumina-ceria-zirconia complex oxide, ceria-zirconia complex oxide, or any metal oxide generally used as carrier particles in the technical field of the exhaust gas purification catalyst.

Accordingly, the downstream coat layer may further include carrier particles. The carrier particles include metal oxide, such as silica ($SiO_2$), magnesium oxide (MgO), zirconia ($ZrO_2$), ceria ($CeO_2$), alumina ($Al_2O_3$), titania ($TiO_2$), yttria ($Y_2O_3$), neodymium oxide ($Nd_2O_3$), and lanthanum oxide ($La_2O_3$), and their complex oxide and solid solution, such as the alumina-ceria-zirconia complex oxide (ACZ), the ceria-zirconia complex oxide (CZ), and the like, a combination of two or more of them, and the like.

An acidic carrier, for example, silica has good compatibility with catalytic metal that reduces NOx. A basic carrier, for example, magnesium oxide has good compatibility with potassium and barium that occlude NOx. Zirconia can efficiently reduce NOx by suppressing sintering of other carrier particles under a high temperature where the other carrier particles are sintered and by generating $H_2$ based on a steam reforming reaction in combination with Rh as a catalytic metal. An acid-base amphoteric carrier, for example, alumina has a high specific surface area, and therefore, alumina can be used for efficiently occlude and reduce NOx. Titania can provide an effect to suppress sulfur poisoning of catalytic metal. By addition, alumina, zirconia, and other metal oxides can enhance durability of a carrier.

It should be understood that, with the property of the carrier particles, there lies a possibility of improving the exhaust gas purification performance, in particular, a NOx conversion performance, of the exhaust gas purification catalyst of the present disclosure depending on the type, the composition, the combination and its proportion, and/or the amount of the selected carrier particles.

When Rh is supported by the carrier particles, a contact surface between the exhaust gas and Rh can be enlarged since the specific surface area of the carrier particles is large. This enables to improve the performance of the exhaust gas purification catalyst.

For a supporting method of Rh to the carrier particles, a generally used method in the technical field of the exhaust gas purification catalyst is usable.

The content of the carrier particles in the downstream coat layer (when the carrier particles include alumina-ceria-zirconia complex oxide and/or ceria-zirconia complex oxide, the content of these complex oxides is included) is not limited, but usually 25 g to 170 g, 100 g to 140 g in some embodiments with respect to 1 L of the capacity of the portion where the downstream coat layer is applied on the substrate. Note that the content of the carrier particles optionally included in the downstream coat layer depends on an additive amount of carrier particles as a material at the production of the exhaust gas purification catalyst.

The inclusion of Rh, alumina-ceria-zirconia complex oxide, and alkaline earth metal in the downstream coat layer enables to suppress HC poisoning of Rh, in particular, suppress HC poisoning of Rh under conditions of (1) rich air-fuel ratio (A/F) and (2) a large air intake quantity during, for example, acceleration in association with a decreased physical size of the exhaust gas purification catalyst (high air intake quantity or high Ga: meaning the same as high space velocity or high SV) by the alkaline earth metal and to secure an OSC by alumina-ceria-zirconia complex oxide at the same time, thereby enabling to obtain the exhaust gas purification catalyst with an improved catalyst performance, in particular, an improved NOx conversion performance.

While the downstream coat layer is constituted mainly of Rh, alumina-ceria-zirconia complex oxide, and alkaline earth metal, the downstream coat layer may further include other components within a range without losing the effect of the present disclosure. The other components include one or more of other metal oxides, additives, and the like used in a catalyst coating layer with this type of usage, specifically, alkali metals, such as potassium (K), sodium (Na), lithium (Li), and cesium (Cs), rare earth elements, such as lanthanum (La), yttrium (Y), and cerium (Ce), transition metals, such as iron (Fe), the metal oxides that have been listed as the carrier particles (that is, the metal oxides not supporting Rh or the like), and the like. The other components may be in a form of as they are or may be in a form of being supported by the carrier particles similarly to Rh and the like.

The content of the other components in the downstream coat layer is not limited, but is usually 20 g to 120 g, 80 g to 120 g in some embodiments with respect to 1 L of the capacity of the portion where the downstream coat layer is applied on the substrate. Note that the content of the other components optionally included in the downstream coat layer depends on an additive amount of the other components as a material at the production of the exhaust gas purification catalyst (excluding volatilized components).

The coat amount of the downstream coat layer is not limited, but is usually 45 g to 250 g, 160 g to 250 g in some embodiments with respect to 1 L of the capacity of the portion where the downstream coat layer is applied on the substrate. Note that the coat amount of the downstream coat layer depends on the total weight of the material at the production of the exhaust gas purification catalyst (excluding volatilized components).

The thickness of the downstream coat layer is not limited, but is usually 5 μm to 50 μm, 10 μm to 30 μm in some embodiments in an average thickness. The thickness of the downstream coat layer can be measured by, for example, SEM.

The amount of each material in the downstream coat layer and the thickness of the downstream coat layer within the range enables to properly keep a balance among a pressure loss, a catalyst performance, and durability in the exhaust gas purification catalyst.

(Upstream Coat Layer)

The upstream coat layer includes catalytic metal.

The catalytic metal included in the upstream coat layer is generally used in the technical field of the exhaust gas purification catalyst, and includes, for example, at least one selected from precious metals, specifically, a group formed of Pt, Pd, Rh, gold (Au), argentum (Ag), iridium (Ir), and ruthenium (Ru). Among these, from the aspect of catalyst performance, at least one selected from a group formed of Pt, Pd, Rh, Ir, and Ru is employed in some embodiments, and Pt and/or Pd is employed in some embodiments.

The content of the catalytic metal included in the upstream coat layer is not limited, but is usually 0.2 g to 5.0 g, 2.0 g to 5.0 g in some embodiments in a metal conversion of the catalytic metal with respect to 1 L of a capacity of a portion where the upstream coat layer is applied on the substrate. Note that the content of the catalytic metal included in the upstream coat layer depends on an additive amount of a catalytic metal precursor as a material at the production of the exhaust gas purification catalyst (excluding volatilized components).

The inclusion of the catalytic metal in the upstream coat layer, in other words, disposing the coat layer including the catalytic metal in the upstream side, that is, in the front portion of the exhaust gas purification catalyst improves a conversion performance of the exhaust gas, in particular, HC, by improved ignitability caused by densification of the catalytic metal, such as Pt and Pd.

While the catalytic metal included in the upstream coat layer functions as the exhaust gas purification catalyst even as it is, in some embodiments, the catalytic metal is supported by carrier particles optionally included in the exhaust gas purification catalyst of the present disclosure.

The carrier particles that support the catalytic metal are not specifically limited, but may be particles of any metal oxide generally used as carrier particles in the technical field of the exhaust gas purification catalyst.

Accordingly, the upstream coat layer may further include the carrier particles. The carrier particles include metal oxide, such as silica, magnesium oxide, zirconia, ceria, alumina, titania, yttria, neodymium oxide, lanthanum oxide, and their complex oxide and solid solution, such as ceria-zirconia complex oxide (CZ) and alumina-ceria-zirconia complex oxide (ACZ), a combination of two or more of them, and the like. Note that the proportion of each oxide in the complex oxide, such as CZ and ACZ is not limited, and may be a proportion generally used in the technical field of the exhaust gas purification catalyst. For CZ and ACZ, for example, the CZ and ACZ described in the item of the downstream coat layer can be used.

For example, ceria has an OSC (Oxygen Storage Capacity) property to occlude oxygen in a lean atmosphere and release oxygen in a rich atmosphere, therefore, ceria can keep the inside of the exhaust gas purification catalyst a stoichiometric atmosphere, and alumina, zirconia, and other metal oxides can enhance durability of a carrier by addition.

It should be understood that, with the property of the carrier particles, there lies a possibility of improving an exhaust gas purification performance, in particular, a HC conversion performance, of the exhaust gas purification catalyst of the present disclosure depending on the type, the composition, the combination and its proportion, and/or the amount of the selected carrier particles.

When the catalytic metal is supported by the carrier particles, a contact surface between the exhaust gas and the catalytic metal can be enlarged since the specific surface area of the carrier particles is large. This enables to improve a performance of the exhaust gas purification catalyst.

For a supporting method of the catalytic metal to the carrier particles, a generally used method in the technical field of the exhaust gas purification catalyst is usable.

The content of the carrier particles in the upstream coat layer is not limited, but is usually 20 g to 200 g, 20 g to 100 g in some embodiments, and 40 g to 100 g in some embodiments with respect to 1 L of the capacity of the portion where the upstream coat layer is applied on the substrate. Note that the content of the carrier particles included in the upstream coat layer depends on an additive amount of the carrier particles as a material at the production of the exhaust gas purification catalyst.

Although the upstream coat layer is constituted mainly of a precious metal as a catalytic metal and the carrier particles that support the precious metal, the upstream coat layer may further include other components within a range without losing the effect of the present invention. The other components include one or more of other metal oxides, additives, and the like used in a catalyst coating layer with this type of usage, specifically, alkali metals, such as potassium (K), sodium (Na), lithium (Li), and cesium (Cs), alkaline earth metals, such as barium (Ba), calcium (Ca), and strontium (Sr), rare earth elements, such as lanthanum (La), yttrium (Y), and cerium (Ce), transition metals, such as iron (Fe), the metal oxides that have been listed as the carrier particles (that is, the metal oxides not supporting the catalytic metal or the like), and the like. The other components may be in a form of as they are or may be in a form of being supported by the carrier particles similarly to the catalytic metal.

The content of the other component in the upstream coat layer is not limited, but is usually 10 g to 100 g, 20 g to 100 g in some embodiments, and 40 g to 100 g in some embodiments with respect to 1 L of the capacity of the portion where the upstream coat layer is applied on the substrate. Note that the content of the other component optionally included in the upstream coat layer depends on an additive amount of the other component as a material at the production of the exhaust gas purification catalyst (excluding volatilized components).

The coat amount of the upstream coat layer is not limited, but is usually 40 g to 200 g, 100 g to 200 g in some embodiments with respect to 1 L of the capacity of the portion where the upstream coat layer is applied on the substrate. Note that the coat amount of the upstream coat layer depends on a total weight of the material at the production of the exhaust gas purification catalyst (excluding volatilized components).

The thickness of the upstream coat layer is not limited, but is usually 5 μm to 50 μm, 10 μm to 30 μm in some embodiments in an average thickness. The thickness of the upstream coat layer can be measured by, for example, SEM.

The amount of each material in the upstream coat layer and the thickness of the upstream coat layer within the ranges enables to properly keep a balance among a pressure loss, a catalyst performance, and durability in the exhaust gas purification catalyst.

(Method for Producing Exhaust Gas Purification Catalyst)

The exhaust gas purification catalyst of the present disclosure can be produced using a known coating technique except that the composition components of the exhaust gas purification catalyst described above is used.

The exhaust gas purification catalyst of the present disclosure can be produced, for example, as follows. First, on the region where the upstream coat layer is to be formed on the substrate, catalyst coating layer slurry for the upstream coat layer including the materials that constitute the upstream coat layer, for example, the catalytic metal precursor, for example, salt, for example, nitrate including Pt and/or Pd, a solvent (for example, water, alcohol, and a mixture of water and alcohol) and optionally carrier particles, for example, alumina-ceria-zirconia complex oxide and/or ceria-zirconia complex oxide, additives and the like are coated by a wash coat method. After blowing off extra slurry with a blower or the like, for example, the coated substrate is dried for usually one hour to three hours at usually 100° C. to 150° C. in the atmosphere to remove the solvent, and is fired for usually one hour to three hours at usually 450° C. to 550° C. in the atmosphere to form the upstream coat layer. Subsequently, on the region where the downstream coat layer is to be formed on the substrate where the upstream coat layer has been formed, catalyst coating layer slurry for the downstream coat layer including the materials that constitute the downstream coat layer, that is, the Rh precursor, for example, salt, for example, nitrate including Rh, alumina-ceria-zirconia complex oxide, and a compound including alkaline earth metal, for example, salt, for example, sulfate and/or acetate including barium and/or strontium, a solvent (for example, water, alcohol, and a mixture of water and alcohol) and optionally further carrier particles, for example, ceria-zirconia complex oxide, additives and the like are coated by the wash coat method. After blowing off extra slurry with the blower or the like, for example, the coated substrate is dried for usually one hour to three hours at usually 100° C. to 150° C. in the atmosphere to remove the solvent, and is fired for usually one hour to three hours at usually 450° C. to 550° C. in the atmosphere to form the downstream coat layer.

(Usage of Exhaust Gas Purification Catalyst)

The exhaust gas purification catalyst of the present disclosure can significantly provide the effect in an exhaust gas purification performance in the rich atmosphere, and can be used as an exhaust gas purification catalyst that develops a high HC poisoning suppression effect usable even under an environment in the rich atmosphere where the exhaust gas purification catalyst is possibly poisoned by that the excess HC and the like is attracted to the exhaust gas purification catalyst.

EXAMPLES

While the following describes some Examples regarding the present disclosure, it is not intended to limit the present disclosure to those described in such Examples.

1. Used Material

Material 1 ($Al_2O_3$)
: $La_2O_3$—$Al_2O_3$ composite
($La_2O_3$: 1% by weight to 10% by weight)
Material 2 (ACZ complex oxide)
: $Al_2O_3$—$CeO_2$—$ZrO_2$ complex oxide
($Al_2O_3$: 10% by weight to 55% by weight)
($CeO_2$: 15% by weight to 30% by weight)
($ZrO_2$: 30% by weight to 60% by weight)
(in which a trace of $Nd_2O_3$, $La_2O_3$, $Y_2O_3$ are added and which is treated to be highly heat resistant)
Material 3 (CZ complex oxide 1 or CZ1)
: $CeO_2$—$ZrO_2$ complex oxide
($CeO_2$: 40% by weight, $ZrO_2$: 50% by weight, $La_2O_3$: 5% by weight, $Y_2O_3$: 5% by weight)
(prepared based on JP 2011-219329 A)
Material 4 (Pd medicinal solution)
: palladium nitrate (Pd nitrate)
Material 5 (Rh medicinal solution)
: rhodium nitrate (Rh nitrate)
Material 6 (Ba sulfate)
: barium sulfate
Material 7 (CZ complex oxide 2 or CZ2)
: $CeO_2$—$ZrO_2$ complex oxide
($CeO_2$: 30% by weight, $ZrO_2$: 60% by weight, $La_2O_3$: 5% by weight, $Y_2O_3$: 5% by weight)
Material 8 (Sr acetate)
: strontium acetate
Substrate
: a cordierite honeycomb substrate of 875 cc (600 cell hexagons, wall thickness of 2 mil)

2. Preparation of Exhaust Gas Purification Catalyst

Example 1

First, Material 4 (Pd medicinal solution), Material 1 ($Al_2O_3$), Material 2 (ACZ complex oxide), Material 3 (CZ complex oxide 1), Material 6 (Ba sulfate), and an $Al_2O_3$-based binder were, while being stirred, introduced into distilled water to prepare a suspended slurry 1.

Next, the prepared slurry 1 was casted to the substrate and the excess was blown off with a blower, and thus, the materials were coated on the wall surface of the substrate and a precursor layer of the upstream coat layer was prepared. At this time, with respect to 1 L of the capacity of the portion where the upstream coat layer was to be applied on the substrate, the contents of the respective coating materials were set in such a way that Material 4 had 5 g in a metal conversion of Pd (5 g/L-zone), Material 1 had 50 g (50 g/L-zone), Material 2 had 95 g (95 g/L-zone), Material 3 had 10 g (10 g/L-zone), and Material 6 had 13 g (13 g/L-zone). The coat width of the precursor layer of the upstream coat layer was adjusted to occupy 35% of the whole length of the substrate in the exhaust gas purification catalyst from the end portion in the upstream side with respect to the exhaust gas flow direction in the exhaust gas purification catalyst.

Finally, after the water content was reduced for two hours with a dryer kept at 120° C., firing was performed for two hours with an electric furnace kept at 500° C. to prepare the upstream coat layer (front portion).

Subsequently, Material 5 (Rh medicinal solution), Material 1 ($Al_2O_3$), Material 2 (ACZ complex oxide), Material 3 (CZ complex oxide 1), Material 6 (Ba sulfate), and an $Al_2O_3$-based binder were, while being stirred, introduced into distilled water to prepare a suspended slurry 2 similarly to the above.

Next, the prepared slurry 2 was casted to the substrate on which the upstream coat layer was formed from an end surface opposite of the end surface where the upstream coat layer was formed and the excess was blown off with a blower, and thus, the materials were coated on the wall surface of the substrate and a precursor layer of the downstream coat layer was prepared. At this time, with respect to 1 L of the capacity of the portion where the downstream coat layer was to be applied on the substrate, the contents of the respective coating materials were set in such a way that Material 5 had 0.77 g in a metal conversion of Rh (0.77 g/L-zone), Material 1 had 35 g (35 g/L-zone), Material 2 had 105 g (105 g/L-zone), Material 3 had 12 g (12 g/L-zone), and Material 6 had 10.1 g (10.1 g/L-zone). The coat width of the precursor layer of the downstream coat layer was adjusted to occupy 80% of the whole length of the substrate in the exhaust gas purification catalyst from the end portion in the downstream side with respect to the exhaust gas flow direction in the exhaust gas purification catalyst.

Finally, after the water content was reduced for two hours with a dryer kept at 120° C., firing was performed for two hours with an electric furnace kept at 500° C. to prepare the downstream coat layer (rear portion), and finally the exhaust gas purification catalyst was prepared.

Example 2

An exhaust gas purification catalyst was prepared similarly to Example 1 except that the additive amount of Material 6 (Ba sulfate) in the slurry 2 was adjusted to be 5.0 g (5.0 g/L-zone) with respect to 1 L of the capacity of the portion where the downstream coat layer was applied on the substrate as Ba sulfate in Example 1.

Example 3

An exhaust gas purification catalyst was prepared similarly to Example 1 except that the additive amount of Material 6 (Ba sulfate) in the slurry 2 was adjusted to be 15.1 g (15.1 g/L-zone) with respect to 1 L of the capacity of the portion where the downstream coat layer was applied on the substrate as Ba sulfate in Example 1.

Example 4

An exhaust gas purification catalyst was prepared similarly to Example 1 except that Material 6 (Ba sulfate) in the slurry 2 was changed to Material 8 (Sr acetate) in Example 1.

Comparative Example 1

An exhaust gas purification catalyst was prepared similarly to Example 1 except that Material 2 (ACZ complex oxide) in the slurry 2 was changed to Material 7 (CZ complex oxide 2) in Example 1.

Comparative Example 2

First, Material 5 (Rh medicinal solution), Material 1 ($Al_2O_3$), Material 2 (ACZ complex oxide), Material 3 (CZ complex oxide 1), Material 6 (Ba sulfate), and an $Al_2O_3$-based binder were, while being stirred, introduced into distilled water to prepare a suspended slurry 2.

Next, the prepared slurry 2 was casted to the substrate and the excess was blown off with a blower, and thus, the materials were coated on the wall surface of the substrate and a precursor layer of the upstream coat layer was prepared. At this time, with respect to 1 L of the capacity of the portion where the upstream coat layer was to be applied on the substrate, the contents of the respective coating materials were set in such a way that Material 5 had 0.77 g in a metal conversion of Rh (0.77 g/L-zone), Material 1 had 35 g (35 g/L-zone), Material 2 had 105 g (105 g/L-zone), Material 3 had 12 g (12 g/L-zone), and Material 6 had 10.1 g (10.1 g/L-zone). The coat width of the precursor layer of the upstream coat layer was adjusted to occupy 80% of the whole length of the substrate in the exhaust gas purification catalyst from the end portion in the upstream side with respect to the exhaust gas flow direction in the exhaust gas purification catalyst.

Finally, after the water content was reduced for two hours with a dryer kept at 120° C., firing was performed for two hours with an electric furnace kept at 500° C. to prepare the upstream coat layer (front portion).

Subsequently, Material 4 (Pd medicinal solution), Material 1 ($Al_2O_3$), Material 2 (ACZ complex oxide), Material 3 (CZ complex oxide 1), Material 6 (Ba sulfate), and an $Al_2O_3$-based binder were, while being stirred, introduced into distilled water to prepare a suspended slurry 1 similarly to the above.

Next, the prepared slurry 1 was casted to the substrate on which the upstream coat layer was formed from an end surface opposite of the end surface where the upstream coat layer was formed and the excess was blown off with a blower, and thus, the materials were coated on the wall surface of the substrate and a precursor layer of the downstream coat layer was prepared. At this time, with respect to 1 L of the capacity of the portion where the downstream coat layer was to be applied on the substrate, the contents of the respective coating materials were set in such a way that Material 4 had 5 g in a metal conversion of Pd (5 g/L-zone), Material 1 had 50 g (50 g/L-zone), Material 2 had 95 g (95 g/L-zone), Material 3 had 10 g (10 g/L-zone), and Material 6 had 13 g (13 g/L-zone). The coat width of the precursor layer of the downstream coat layer was adjusted to occupy 35% of the whole length of the substrate in the exhaust gas purification catalyst from the end portion in the downstream side with respect to the exhaust gas flow direction in the exhaust gas purification catalyst.

Finally, after the water content was reduced for two hours with a dryer kept at 120° C., firing was performed for two hours with an electric furnace kept at 500° C. to prepare the downstream coat layer (rear portion), and finally the exhaust gas purification catalyst was prepared.

Comparative Example 3

An exhaust gas purification catalyst was prepared similarly to Example 1 except that the upstream side and the downstream side of the exhaust gas purification catalyst in Example 1 were interchanged (that is, the upstream coat layer (the front portion) of the exhaust gas purification catalyst in Example 1 was replaced by the downstream coat layer (the rear portion) and the downstream coat layer (the rear portion) was replaced by the upstream coat layer (the front portion).

Comparative Example 4

An exhaust gas purification catalyst was prepared similarly to Example 1 except that Material 6 (Ba sulfate) in the slurry 2 was not used in Example 1.

Comparative Example 5

An exhaust gas purification catalyst was prepared similarly to Example 1 except that Material 2 (ACZ complex oxide) in the slurry 2 was changed to Material 7 (CZ complex oxide 2) and Material 3 (CZ complex oxide 1) in the slurry 2 was not used in Example 1.

Table 1 summarizes the catalyst compositions of the exhaust gas purification catalysts in Examples 1 to 4 and Comparative Examples 1 to 5.

TABLE 1

List of Preparation Standards of Examples, Comparative Examples

| | Upstream Coat Layer | | | | Downstream Coat Layer | | | | Alkaline Earth Metal Amount in Rh Layer |
|---|---|---|---|---|---|---|---|---|---|
| | Slurry | Precious Metal | Layer Direction Layer Width | Coat Amount | Slurry | Precious Metal | Layer Direction Layer Width | Coat Amount | |
| Example 1 | Al$_2$O$_3$ ACZ CZ1 Ba Sulfate | Pd Nitrate 5 g/L-zone | Lower Layer 35% | 173 g/ L-zone | Al$_2$O$_3$ ACZ CZ1 Ba Sulfate | Rh Nitrate 0.77 g/ L-zone | Upper Layer 80% | 162.9 g/ L-zone | 10.1 g/ L-zone |
| Example 2 | Al$_2$O$_3$ ACZ CZ1 Ba Sulfate | Pd Nitrate 5 g/L-zone | Lower Layer 35% | 173 g/ L-zone | Al$_2$O$_3$ ACZ CZ1 Ba Sulfate | Rh Nitrate 0.77 g/ L-zone | Upper Layer 80% | 157.9 g/ L-zone | 5.0 g/ L-zone |
| Example 3 | Al$_2$O$_3$ ACZ CZ1 Ba Sulfate | Pd Nitrate 5 g/L-zone | Lower Layer 35% | 173 g/ L-zone | Al$_2$O$_3$ ACZ CZ1 Ba Sulfate | Rh Nitrate 0.77 g/ L-zone | Upper Layer 80% | 167.9 g/ L-zone | 15.1 g/ L-zone |
| Example 4 | Al$_2$O$_3$ ACZ CZ1 Ba Sulfate | Pd Nitrate 5 g/L-zone | Lower Layer 35% | 173 g/ L-zone | Al$_2$O$_3$ ACZ CZ1 Sr Acetate | Rh Nitrate 0.77 g/ L-zone | Upper Layer 80% | 162.9 g/ L-zone | 10.1 g/ L-zone |
| Comparative Example 1 | Al$_2$O$_3$ ACZ CZ1 Ba Sulfate | Pd Nitrate 5 g/L-zone | Lower Layer 35% | 173 g/ L-zone | Al$_2$O$_3$ CZ2 CZ1 Ba Sulfate | Rh Nitrate 0.77 g/ L-zone | Upper Layer 80% | 162.9 g/ L-zone | 10.1 g/ L-zone |
| Comparative Example 2 | Al$_2$O$_3$ ACZ CZ1 Ba Sulfate | Rh Nitrate 0.77 g/L-zone | Lower Layer 80% | 162.9 g/ L-zone | Al$_2$O$_3$ ACZ CZ1 Ba Sulfate | Pd Nitrate 5 g/ L-zone | Upper Layer 35% | 173 g/ L-zone | 10.1 g/ L-zone |
| Comparative Example 3 | Al$_2$O$_3$ ACZ CZ1 Ba Sulfate | Rh Nitrate 0.77 g/L-zone | Upper Layer 80% | 162.9 g/ L-zone | Al$_2$O$_3$ ACZ CZ1 Ba Sulfate | Pd Nitrate 5 g/ L-zone | Lower Layer 35% | 173 g/ L-zone | 10.1 g/ L-zone |
| Comparative Example 4 | Al$_2$O$_3$ ACZ CZ1 Ba Sulfate | Pd Nitrate 5 g/L-zone | Lower Layer 35% | 173 g/ L-zone | Al$_2$O$_3$ ACZ CZ1 Ba Sulfate | Rh Nitrate 0.77 g/ L-zone | Upper Layer 80% | 152.9 g/ L-zone | 0 g/ L-zone |
| Comparative Example 5 | Al$_2$O$_3$ ACZ CZ1 Ba Sulfate | Pd Nitrate 5 g/L-zone | Lower Layer 35% | 173 g/ L-zone | Al$_2$O$_3$ CZ2 Ba Sulfate | Rh Nitrate 0.77 g/ L-zone | Upper Layer 80% | 162.9 g/ L-zone | 10.1 g/ L-zone |

3. Durability Test

The following durability tests were performed using actual engines for Examples 1 to 4 and Comparative Examples 1 to 5.

The tests were performed by mounting the exhaust gas purification catalysts on exhaust systems of V8 engines, respectively, and repeatedly flowing exhaust gases in respective atmospheres of stoichiometric and lean at each certain period of time (ratio of 3:1) at a catalyst bed temperature of 950° C. and over 50 hours.

4. Performance Evaluation

The following performance evaluations were performed using actual engines for the exhaust gas purification catalysts in Examples 1 to 4 and Comparative Examples 1 to 5 that have undergone 3. Durability Test.

4-1. NOx Conversion Rate in Rich Atmosphere

The exhaust gas purification catalysts were mounted on exhaust systems of L-type four-cylinder engines, respectively, and an exhaust gas with an air-fuel ratio (A/F) of 14.4 was supplied, and a NOx conversion rate when the inlet gas temperature reached 550° C. was used as the NOx conversion rate in a rich atmosphere.

4-2. OSC Evaluation

The exhaust gas purification catalysts were mounted on exhaust systems of L-type four-cylinder engines, respectively, and an A/F feedback control was performed such that the A/F became 14.1 and 15.1 under conditions of Ga=22/s, 600° C. From the difference between a stoichiometric point and an A/F sensor output, an excess or shortage of oxygen was calculated from the following formula, and the evaluation was made using the maximum oxygen occlusion amount in Ga=22/s, 600° C. as OSC.

$$OSC (g) = 0.23 \times \Delta A/F \times \text{injected fuel amount}$$

5. Evaluation Result

Table 2 shows NOx conversion rates in a rich atmosphere and OSC results of the respective exhaust gas purification catalysts.

TABLE 2

|  | NOx Conversion Rate (%) | OSC/g |
|---|---|---|
| Example 1 | 89.9 | 0.234 |
| Example 2 | 76.1 | 0.233 |
| Example 3 | 77.8 | 0.195 |
| Example 4 | 85.5 | 0.236 |
| Comparative Example 1 | 90.0 | 0.180 |
| Comparative Example 2 | 68.4 | 0.234 |
| Comparative Example 3 | 70.5 | 0.243 |
| Comparative Example 4 | 71.6 | 0.238 |
| Comparative Example 5 | 69.2 | 0.185 |

Figure 2:
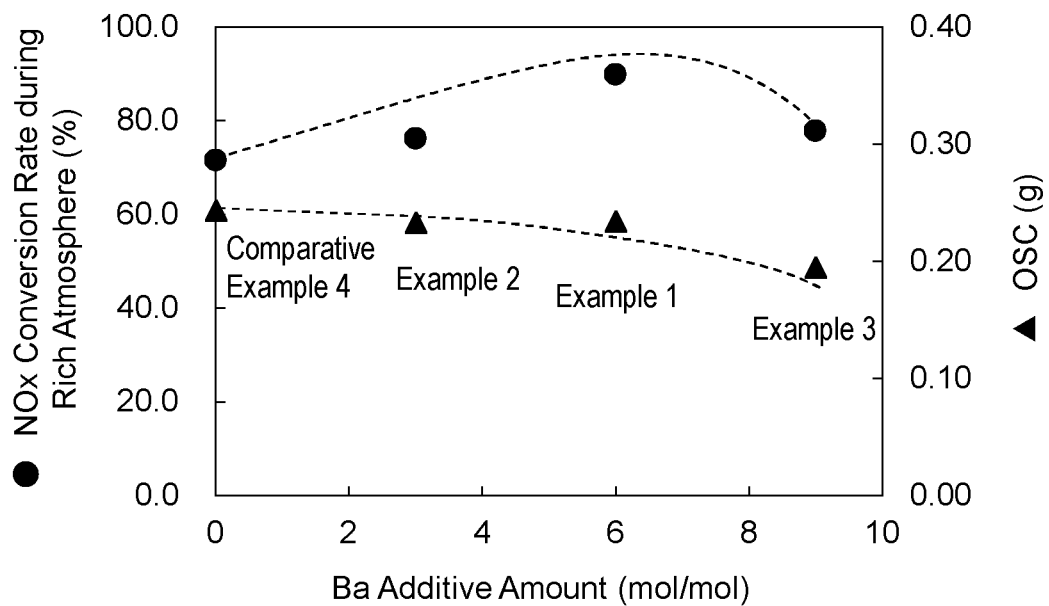
FIG. 2 is a graph showing a relation between Ba additive amounts, and NOx conversion rates in a rich atmosphere and OSCs for exhaust gas purification catalysts in Comparative Example 4 and Examples 1 to 3.

Furthermore, FIG. 2 illustrates a relation between Ba additive amounts and the NOx conversion rates in a rich atmosphere and the OSC results for the respective exhaust gas purification catalysts.

From Table 2 and FIG. 2, it is found that the NOx conversion rate in a rich atmosphere improves by adding Ba in the downstream coat layer. In particular, when the Ba additive amount in the downstream coat layer is 6 mol/mol with respect to the mole number of Rh (Example 1), the NOx conversion rate in a rich atmosphere was the highest. However, from Examples 1 to 3, it is found that excessively increasing the Ba additive amount delays the Rh activation because Ba is reduced prior to Rh, thereby reducing OSC. From Example 4, it is found that using Sr instead of Ba also enables to obtain an effect similar to that of Ba.

Table 3 shows compositions of the respective exhaust gas purification catalysts.

TABLE 3

|  | Ba Additive Position | Additive Amount (mol/mol) | OSC Material | Composition |
|---|---|---|---|---|
| Example 1 | Rh Layer | 6 | ACZ | Upstream Coat Layer (Lower Layer) Pd × Downstream Coat Layer (Upper Layer) Rh |
| Comparative Example 1 | Rh Layer | 6 | CZ | Upstream Coat Layer (Lower Layer) Pd × Downstream Coat Layer (Upper Layer) Rh |
| Comparative Example 2 | Rh Layer | 6 | ACZ | Upstream Coat Layer (Lower Layer) Rh × Downstream Coat Layer (Upper Layer) Pd |
| Comparative Example 3 | Rh Layer | 6 | ACZ | Upstream Coat Layer (Upper Layer) Rh × Downstream Coat Layer (Lower Layer) Pd |

Figure 3:
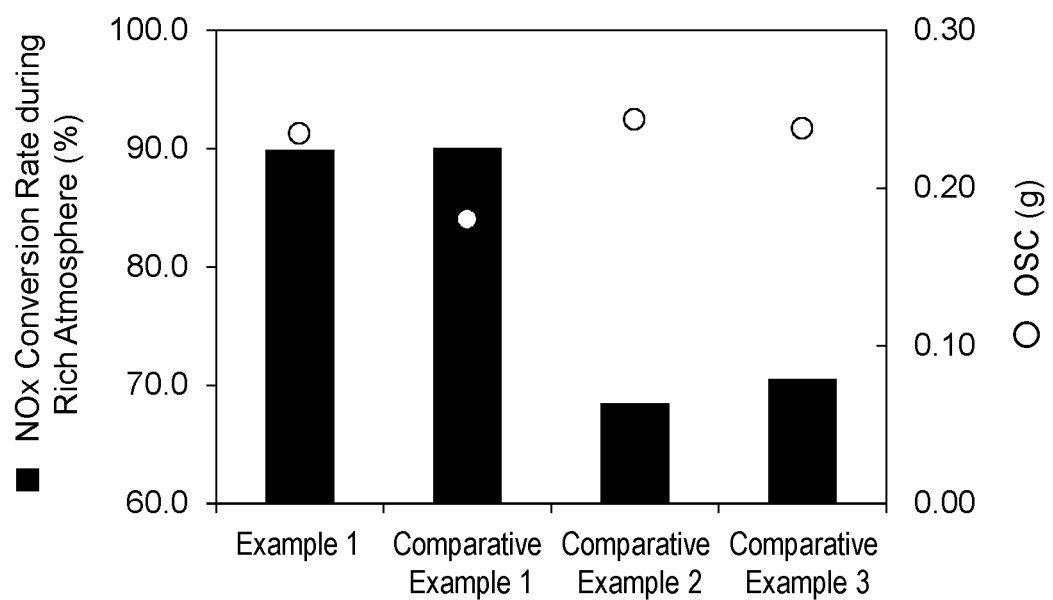
FIG. 3 is a graph showing NOx conversion rates in the rich atmosphere and OSC results of exhaust gas purification catalysts in Comparative Examples 1 to 3 and Example 1.

Furthermore, FIG. 3 illustrates NOx conversion rates in a rich atmosphere and OSC results of Example 1 and Comparative Examples 1 to 3.

From Table 3 and FIG. 3, when Example 1 and Comparative Example 1 are compared, the NOx conversion rates in a rich atmosphere are almost the same, whereas OSC is reduced when CZ is used instead of ACZ in the downstream coat layer. This is presumed that, because the oxygen release rate of CZ is slower than the oxygen release rate of ACZ, the reduction in OSC is significantly exhibited.

Moreover, when Example 1 and Comparative Example 2 or Comparative Example 3 are compared, it was found that Comparative Example 2 and Comparative Example 3 have the structures with low Rh usage efficiency compared with the structure of Example 1, resulting in the decreased NOx conversion rates in a rich atmosphere.

All publications, patents and patent applications cited in the present description are herein incorporated by reference as they are.

What is claimed is:

1. An exhaust gas purification catalyst comprising:
   a substrate; and
   a catalyst coating layer coated on the substrate,
   wherein the catalyst coating layer includes an upstream coat layer and a downstream coat layer, the upstream coat layer being formed from an end portion in an upstream side with respect to an exhaust gas flow direction in the exhaust gas purification catalyst, the downstream coat layer being formed from an end portion in a downstream side with respect to the exhaust gas flow direction in the exhaust gas purification catalyst, wherein the downstream coat layer includes Rh as a catalytic metal, alumina-ceria-zirconia complex oxide, and alkaline-earth metal, and wherein the alkaline-earth metal has a content of 2 mol to 9 mol with respect to 1 mol of a mole number of Rh.

2. The exhaust gas purification catalyst according to claim 1, wherein the alkaline-earth metal is barium and/or strontium.

3. The exhaust gas purification catalyst according to claim 1, wherein the upstream coat layer includes Pd and/or Pt as catalytic metal.

4. The exhaust gas purification catalyst according to claim 1, wherein the upstream coat layer has a width of 20% to 50% of a whole length of the substrate in the exhaust gas purification catalyst from the end portion in the upstream side with respect to the exhaust gas flow direction in the exhaust gas purification catalyst.

5. The exhaust gas purification catalyst according to claim 1, wherein the downstream coat layer has a width of 60% to 80% of a whole length of the substrate in the exhaust gas purification catalyst from the end portion in the downstream side with respect to the exhaust gas flow direction in the exhaust gas purification catalyst.

6. The exhaust gas purification catalyst according to claim 1, wherein the alumina-ceria-zirconia complex oxide included in the downstream coat layer has a Ce/Zr mole ratio of 0.1 to 0.6, and a content of an alumina ($Al_2O_3$) component is 40% by weight to 70% by weight with respect to a total weight of alumina-ceria-zirconia complex oxide.

7. The exhaust gas purification catalyst according to claim 1, wherein a content of alumina-ceria-zirconia complex oxide included in the downstream coat layer is 20 g to 120 g with respect to 1 L of a capacity of a portion where the downstream coat layer is applied on the substrate, and a content of Rh included in the downstream coat layer is 0.05 g to 1.0 g in a metal conversion of Rh with respect to 1 L of the capacity of the portion where the downstream coat layer is applied on the substrate.

8. The exhaust gas purification catalyst according to claim 1, wherein the catalyst coating layer consists of a single layer of the upstream coat layer and a single layer of the downstream coat layer.

9. An exhaust gas purification catalyst comprising:
a substrate; and
a catalyst coating layer coated on the substrate,
wherein the catalyst coating layer includes an upstream coat layer and a downstream coat layer, the upstream coat layer being formed from an end portion in an upstream side with respect to an exhaust gas flow direction in the exhaust gas purification catalyst, the downstream coat layer being formed from an end portion in a downstream side with respect to the exhaust gas flow direction in the exhaust gas purification catalyst, wherein the downstream coat layer includes Rh as a catalytic metal, alumina-ceria-zirconia complex oxide, and alkaline-earth metal, wherein the alkaline-earth metal has a content of 2 mol to 9 mol with respect to 1 mol of a mole number of Rh, and wherein the upstream coat layer and the downstream coat layer overlap, and the upstream coat layer is disposed under the downstream coat layer at least in a region of the overlap.

10. The exhaust gas purification catalyst according to claim 9, wherein the alkaline-earth metal is barium and/or strontium.

11. The exhaust gas purification catalyst according to claim 9, wherein the upstream coat layer includes Pd and/or Pt as catalytic metal.

12. The exhaust gas purification catalyst according to claim 9, wherein the upstream coat layer has a width of 20% to 50% of a whole length of the substrate in the exhaust gas purification catalyst from the end portion in the upstream side with respect to the exhaust gas flow direction in the exhaust gas purification catalyst.

13. The exhaust gas purification catalyst according to claim 9, wherein the downstream coat layer has a width of 60% to 80% of a whole length of the substrate in the exhaust gas purification catalyst from the end portion in the downstream side with respect to the exhaust gas flow direction in the exhaust gas purification catalyst.

14. The exhaust gas purification catalyst according to claim 9, wherein the alumina-ceria-zirconia complex oxide included in the downstream coat layer has a Ce/Zr mole ratio of 0.1 to 0.6, and a content of an alumina ($Al_2O_3$) component is 40% by weight to 70% by weight with respect to a total weight of alumina-ceria-zirconia complex oxide.

15. The exhaust gas purification catalyst according to claim 9, wherein a content of alumina-ceria-zirconia complex oxide included in the downstream coat layer is 20 g to 120 g with respect to 1 L of a capacity of a portion where the downstream coat layer is applied on the substrate, and a content of Rh included in the downstream coat layer is 0.05 g to 1.0 g in a metal conversion of Rh with respect to 1 L of the capacity of the portion where the downstream coat layer is applied on the substrate.

16. The exhaust gas purification catalyst according to claim 9, wherein the catalyst coating layer consists of a single layer of the upstream coat layer and a single layer of the downstream coat layer.

* * * * *